United States Patent [19]
Krill et al.

[11] Patent Number: 5,161,063
[45] Date of Patent: Nov. 3, 1992

[54] OBJECTIVES FOR AN OPTICAL DATA STORAGE HEAD

[75] Inventors: Daniel M. Krill, Rochester; Duncan T. Moore, Fairport, both of N.Y.

[73] Assignee: University of Rochester, Rochester, N.Y.

[21] Appl. No.: 659,197

[22] Filed: Feb. 21, 1991

[51] Int. Cl.[5] ............................................. G02B 13/18
[52] U.S. Cl. ................................. 359/654; 359/653; 359/652; 369/112
[58] Field of Search .................... 359/652, 653, 654; 369/112

[56] References Cited

U.S. PATENT DOCUMENTS

| | | | |
|---|---|---|---|
| 3,729,253 | 4/1973 | Moore et al. | 359/653 |
| 4,270,843 | 6/1981 | Goto | 359/794 |
| 4,416,519 | 11/1983 | Kobayashi | 359/661 |
| 4,457,590 | 7/1984 | Moore | 359/654 |
| 4,668,055 | 5/1987 | Nishi et al. | 359/654 |
| 4,902,113 | 2/1990 | Ishiwata | 359/652 |

OTHER PUBLICATIONS

G. T. Sincerbox, "Miniature Optics for Optical Recording", IBM Research Division, San Jose, Calif., 1989.
J. Bseat, Optics News, Jun. 1988, pp. 21, 22.
S. Kubata, SPIE, vol. 554, The Proceedings of the 1985 International Lens Design Conference, pp. 282–288.
Journal of the Optical Society of America, vol. 61, No. 7, pp. 886–894 Jul. 1971.
Journal of the Optical Society of America, vol. 67, No. 9, Sep. 1977, pp. 1137–1143.
H. Nishi, et al. Applied Optics, vol. 25, No. 19, Oct. 1986, pp. 3340–3344.
Spie, vol. 554, International Lens Design Conference (1985), pp. 301–306.

*Primary Examiner*—Carolyn E. Fields
*Assistant Examiner*—Drew A. Dunn
*Attorney, Agent, or Firm*—Martin Lukacher

[57] ABSTRACT

An objective for an optical data storage read/write head focuses a laser beam at a spot on an optical recording surface protected by a transparent cover of an optical disc. The imaging is provided by a gradient index singlet lens having bending and an index gradient which is selected depending on the thickness of the lens and the thickness of the cover over the recording surface so as to provide aberration correction over a paraxial image height of the spot which tolerates tracking errors (displacements with respect to the track) on the recording surface. The objective desirably obtains its power exclusively from the curvature of its surfaces, with the index gradient providing for aberration correction. The gradient is preferably axial, decreasing from the vertex at the front surface (the surface on which the laser beam is incident) over a sag distance along the optical axis towards the back surface, which is opposite to the cover of the optical data storage device. The back surface is preferably planar and perpendicular to the optical axis.

18 Claims, 4 Drawing Sheets

OBJECTIVES FOR AN OPTICAL DATA STORAGE HEAD

DESCRIPTION

The present invention relates to objectives for an optical data storage (ODS) read/write head which focuses a laser beam at a spot on an optical recording surface of an optical data storage medium such as an optical disk, and particularly to an improved gradient index (GRIN) singlet lens which provides such an objective and has a numerical aperture (NA) and quality (minimization of aberrations) in a lens of thickness less than its focal length, which thickness may be less than 1 millimeter (mm).

The invention is especially suitable for use in heads for optical data storage devices where optical mass data storage is desired in that the lens is so short and has such a short effective focal length that it may be located between disks of a multi-disk optical data storage system thereby permitting stacking of the disks along their axis of rotation.

Lens design techniques are known whereby curvatures of lenses can be adjusted, different combinations of lens elements can be used, air spaces between the elements can be varied in size and lens thicknesses and refractive indices can be changed so as to obtain desired specifications such as effective focal length (measured from the principal plane of the element to the focus rather than from the sagittal plane of the lens), magnification (powers), NA and overall length are obtained. The lens surfaces may be made aspheric. Holographic optical elements or spatially dependent variations in index of refraction (gradient index media) can be used to reduce aberration. A survey of optical data storage (sometimes called optical recording), the nature of the lenses which have been used therein and various types of optical data storage heads are found in an article which was distributed by IBM Research Division, San Jose, Calif. in 1989. The article is authored by G. T. Sincerbox and is entitled "Miniature Optics for Optical Recording". Typical microscope objectives which have been used are shown in U.S. Pat. No. 4,416,519 issued Nov. 22, 1983 and U.S. Pat. No. 4,270,843 issued June 1981. Aspheric gradient index and holographic objectives are mentioned in an article by J. Barat in Optics News, June, 1988, pages 21 and 22. An aspheric design is shown in an article by S. Kubota which appeared in SPIE, Vol. 554, The Proceedings of the 1985 International Lens Design Conference at pages 282–288. Gradient index lens design techniques are taught in patents and publications of one of the inventors hereof, D. T. Moore, namely U.S. Pat. No. 3,729,253; Journal of the Optical Society of America, Vol. 61, No. 7, 886–894, July 1971; Journal of the Optical Society of America, and Vol. 67, No. 9, September 1977, pages 1137–1143. Gradient index lens designs are the subject of D. T. Moore's U.S. Pat. No. 4,457,590 issued Jul. 3, 1984, an article by H. Nishi, et al., Applied Optics, Vol. 25, No. 19, October 1986, pages 3340–3344 and SPIE, Vol. 554, International Lens Design Conference (1985), pages 301–306.

While it has been recognized that there are many choices in lens design to obtain specifications of quality and performance, lens design factors are sometimes in conflict and the recognition of which parameter dictates the design to obtain the specification of cost, quality and performance is critical to meeting those specifications.

It has been discovered in accordance with the invention that the specifications for an optical data storage objective are aberration correction, for example, as is expressed as a composite value of quality of the lens in terms of the rms wavefront error due to the lens and the NA. The NA determines the resolution or spot size to which the lens focuses an incident laser beam. The quality of the lens determines the paraxial height of the image of the laser source at the spot where the aberrations are minimized. The larger the paraxial image height where the wavefront error is less than the Marechal criterion (the diffraction limited spot size), the more tracking error can be tolerated such that the spot need not be precisely on the area of the optical recording surface where the data is recorded. Multiple recording beams may also be used if the paraxial image height where the aberrations are minimized (preferably below the Marechal criterion level) is sufficient. A plurality of recording beams may then be used each for a different track and recorded or read on the optical recording surface simultaneously, thereby increasing the bit rate of the data.

It has been found in accordance with the invention that the gradient in the index of refraction and particularly the profile thereof across the thickness of the lens, improves the lens quality with gradients which provide no additional power to the lens (the power being provided exclusively by the curvature of the lens surfaces) providing surprisingly large increase in quality over objectives of the homogeneous (multi-lens) type, aspheric type and even radial GRIN type. It has been found in accordance with the invention that quality and performance as defined by the wavefront error and NA at short focal lengths in the millimeter range are critically effected by the thickness of the transparent cover layer over the recording surface of the optical data storage device. This transparent layer is sometimes referred to as the cover slip and has been of glass, but is usually of a transparent plastic, such as polycarbonate. It has been found that the cover affects the lens characteristics so that the bending (the ratio of the front to back surface curvatures (c2/c1)) as well as the index gradient is dependent upon the thickness of the cover layer. An objective in accordance with the invention selects the index gradient and the bending in accordance with the thickness of the lens (as measured along the optical axis) and the thickness of the cover layer. The resulting objective, surprisingly, has a much higher NA and lower wavefront error over a larger paraxial image height than other types of lens which have heretofore been described in the technical literature.

An axial gradient which decreases in the direction from the front to back surface of the lens is preferred and bending wherein the back surface is planar is also preferred in the interest of cost and operation in forming an air bearing as the optical disk moves with respect to the head. Gradients which do not add to the power of the lens are generally more preferable than gradients which do add to the lens power. A shallow radial gradient which is considered to exist when the second order radial gradient index coefficient $N_{10}$ is zero in the power series defining the gradient (see the above-referenced U.S. Pat. No. 4,457,590, column 1, line 42 for the power series). Then, substantially all of the index variation is over a limited radial extending inwardly from the peripheral edge of the lens, for example, to less than 50% of the radius of the lens, is desirable especially when cost is a factor because of fabrication thereof is more easily effected than in the case of an axial gradient lens.

The foregoing features and advantages of the invention as well as presently preferred designs of objectives in accordance with the invention will become more apparent from a reading of the following description in connection with the accompanying drawings in which.

Figure 7:
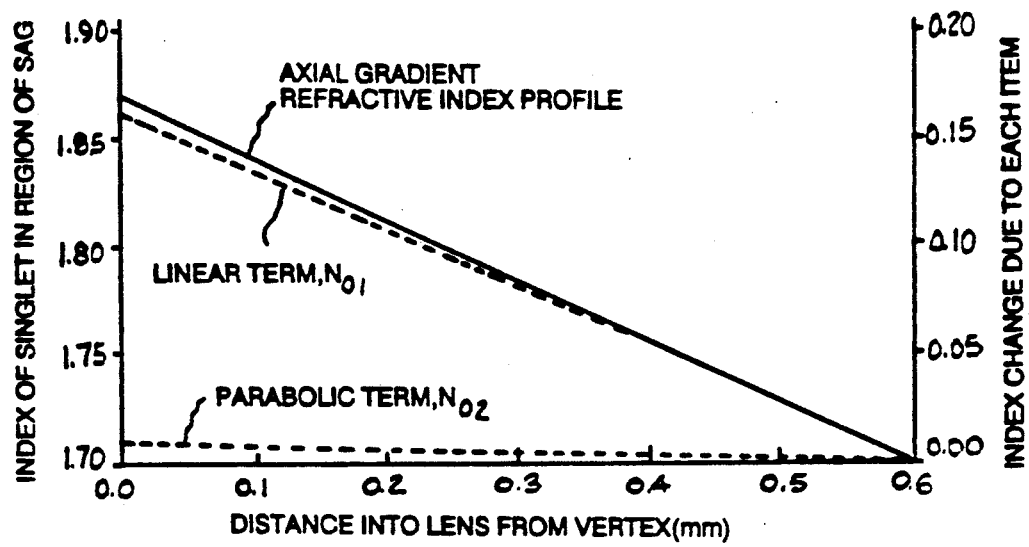
Figure 6:
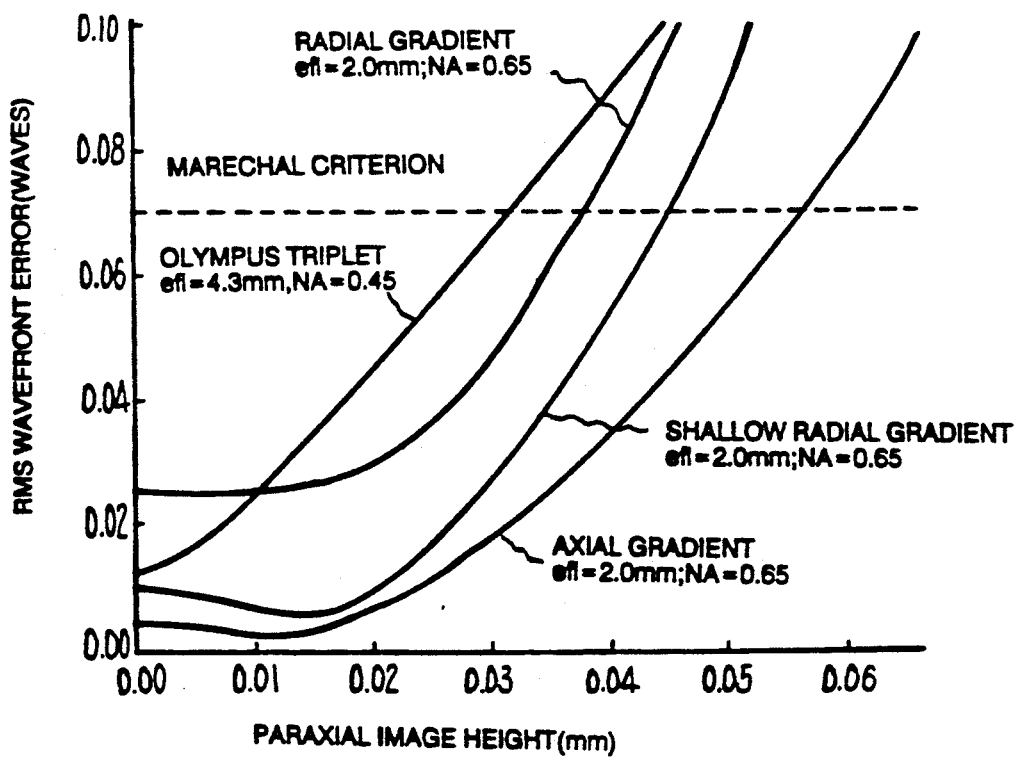

FIGS. 4(a), (b) and (c) are curves showing bending vs. lens thickness of (a) axial, (b) shallow radial and (c) radial gradient index ODS objective lenses in accordance with the thickness of the optical disk cover, the bending and the gradient indices providing NA, efl (effective focal length) at base indices Noo as indicated in the Figures;

FIGS. 5(a), (b) and (c) are curves of maximum index change $\Delta n$, vs. lens thickness of (a) axial, (b) shallow radial, and (c) radial gradient index ODS objectives as a function of the thickness of the disk cover layer; the curves indicate the NA, efl and base indices Noo of each lens family;

FIG. 6 is a family of curves of the rms wavefront error of ODS objectives as a function of the height of image produced by the objective, the dash line indicating the Marechal criterion and showing a curve for a homogeneous objective of the type sold by Olympus and characterized in U.S. Pat. No. 4,270,843 referenced above, an axial gradient objective, a shallow radial gradient objective and a radial gradient objective of efl 2 mm and having NA of 0.65, as provided in accordance with the invention; and FIG. 7 is a curve showing the refractive index profile of a preferred axial gradient index singlet, ODS objective and the contribution to the index change due to each of the terms in the profile, such terms being in the power series equation defining the index as discussed in the above identified patent by D. T. Moore, U.S. Pat. No. 3,729,253.

The following description may be supplemented by reference to the thesis authored by one of the inventors hereof, D. M. Krill, entitled "Axial and Radial Index Gradients in Optical Data Storage Lens" which was available May 1990 in the library of the University of Rochester, Rochester, N.Y. A copy of the thesis being filed with and as a part of this specification.

Figure 1:
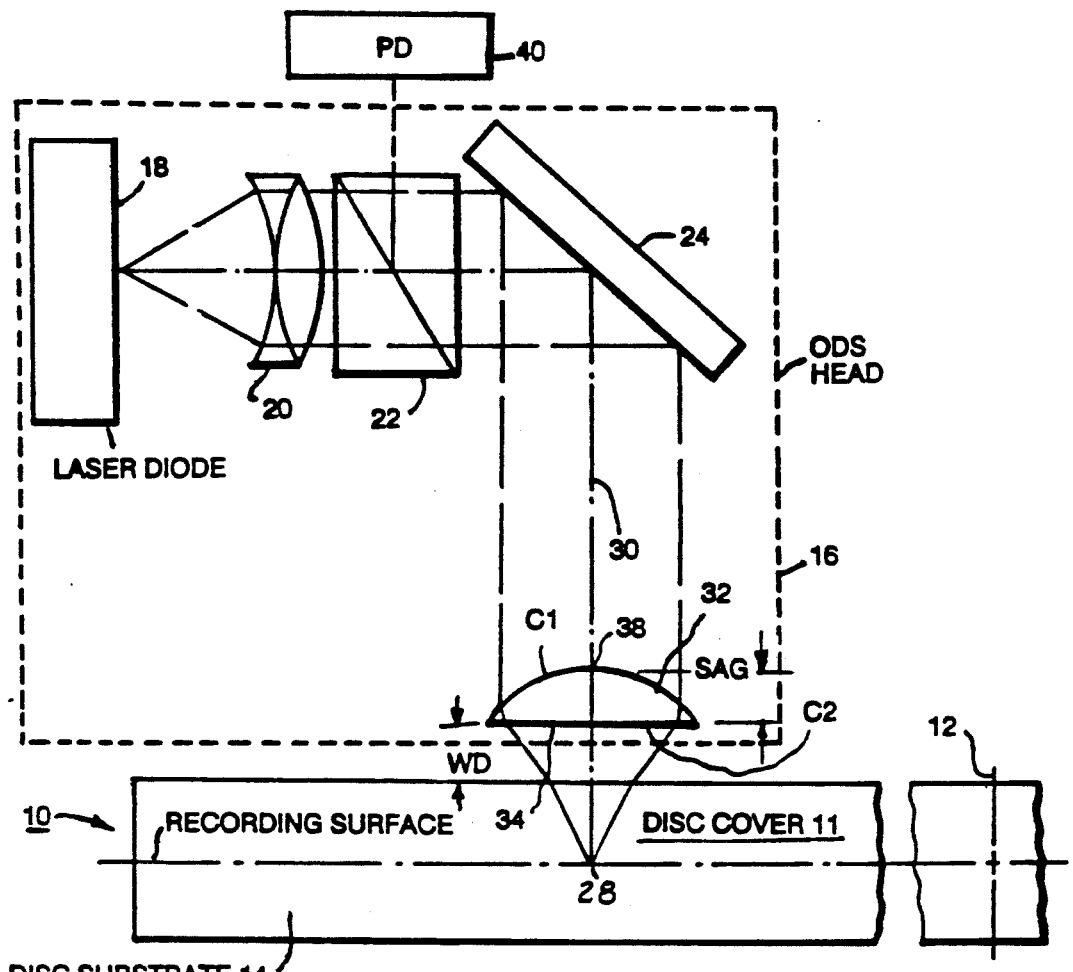
FIG. 1 is a simplified schematic view of an optical data storage system showing an ODS head having a lens with an axial gradient and bending disposed in operating relationship at a desired working distance (WD) from an optical disk data storage medium.

Referring to FIG. 1, there is shown an optical data storage device such as a optical disk 10 which is rotatable about an axis 12. The disk has a recording surface which may be disposed on a surface of a transparent disk cover 11 which protects the surface against dirt and scratching or on a substrate 14. An ODS head 16 includes a laser diode 18, a collimating doublet 20, which forms the beam from the laser diode 18 into a collimated beam passing through a beam splitter 22 to a bending mirror 24 and thence to an axial GRIN objective 26 which focuses the beam to a spot 28 along the optical axis 30. The beam has a width which intersects the front surface 32 of the lens at a distance along the optical axis indicated as the sag of the lens which is where a plane, indicated by the dash line 36, is defined by the outer rays of the beam where they intersect the front surface 32. The optical axis 30 intersects the front surface at the vertex 38.

In reading data on the recording surface, the light is reflected back through the objective and is reflected off the bending mirror 24 and the beam splitter 22 to a photo detector (PD) 40 which is shown outside of the head. It may be located within the head and held by the same fixture which holds the other optical elements 18 to 26 of the head 16.

The front surface has a curvature c1 and the back surface has a curvature c2. The curvature c2 is essentially planar and perpendicular to the optical axis 30. However, the curvature c2 may vary to accommodate different disk cover thicknesses. The disk cover thickness is measured along the optical axis. The back surface 34 is spaced from the disk cover by the working distance WD.

The bending of the lens is the ratio of the curvatures, c2/c1. Bending, when selected in accordance with the lens thickness and cover thickness, has been found to be determinative of the quality and performance of the lens. The curvature of the lens provides the focusing effect. The bending indicates the shape of the lens. It will be appreciated that the same focusing power is obtainable with lenses having different bending. Both the gradient index and the curvature contribute to aberration correction. In an axial GRIN and also in a shallow radial GRIN (FIG. 2), the GRIN does not add to the power of the lens. It is the curvatures, thickness and index of refraction which define the lens power.

Figure 3:
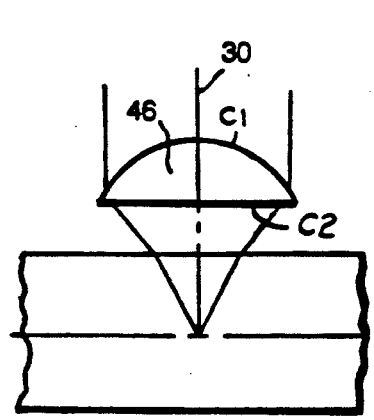
FIG. 3 is a view similar to FIG. 2 of an optical data storage radial gradient index objective in accordance with another embodiment of the invention.
Figure 2:
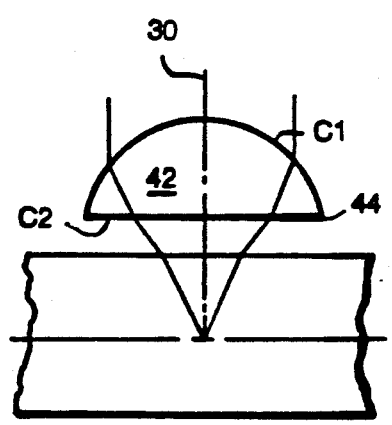
FIG. 2 is a view showing a shallow radial gradient index objective in relationship to a optical disk similar to that of the objective shown in FIG. 1, the shallow radial objective being in accordance with another embodiment of the invention.

The axial GRIN as well as the radial GRINs of the objectives shown in FIGS. 2 and 3 may be provided by ion diffusion or other known processes. The profile of the axial gradient is preferably such that the gradient decreases in a direction from the front to the back surface. The gradient should be at least in the sag of the lens body. FIG. 7 illustrates a preferred axial gradient. The shallow radial GRIN singlet 42 shown in FIG. 2 has a shallow radial gradient profile defined above. This gradient decreases in a direction towards the optical axis 30. All of the lenses shown in FIGS. 1, 2 and 3 are circular around their peripheral edges. The radial index GRIN objective 46 shown in FIG. 3 has a index which increases from its peripheral edge to its optical axis.

Figure 4:
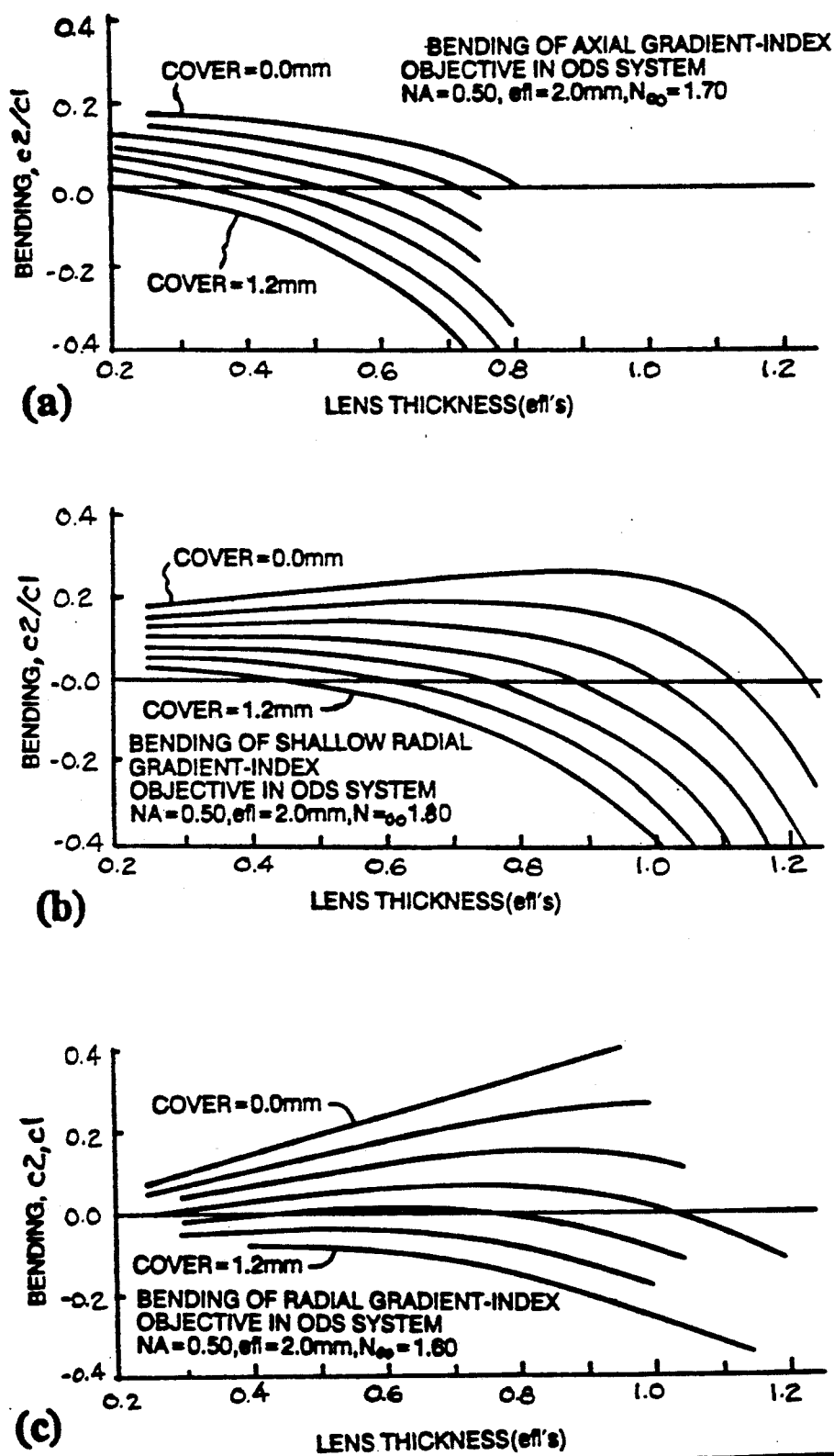
Figure 5:
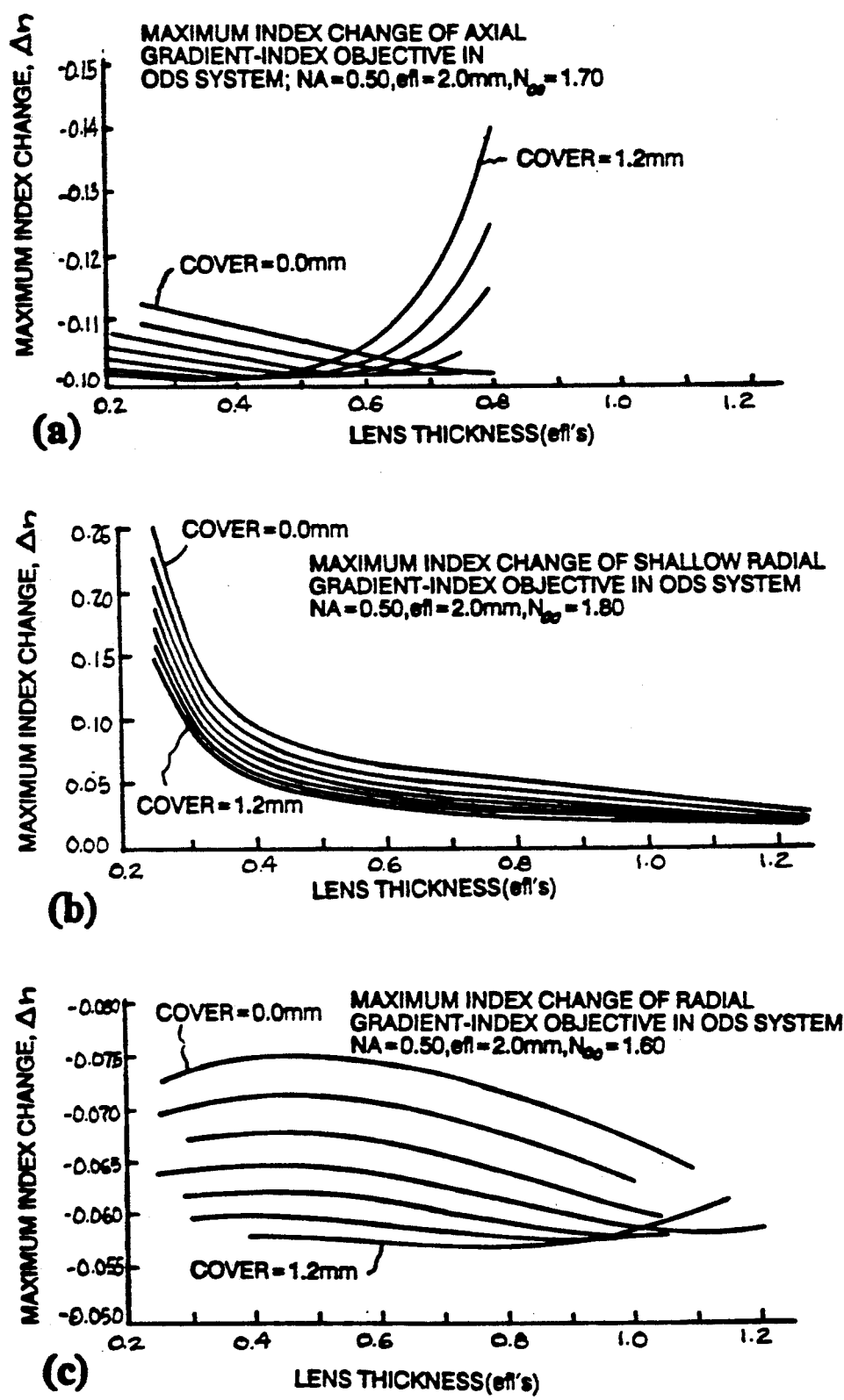

The curves in FIGS. 4 and 5 illustrate the ranges of the bending with cover thickness and lens thickness and of maximum index change $\Delta n$ with lens thickness and cover thickness. The curves show desired lens thicknesses where the bending is 0, that is the curvature c2 is planar which is desirable in that the planar back surface forms a air bearing as the disk evolves past the lens. In the case of the axial gradient index objective 26 (FIG. 1), the thickness varies from about 0.2 to 0.8 efl. The cover thickness varies from about 0.00 mm to about 1.2 mm. The bending varies from about 0.175 to −0.4 and the axial gradient $\Delta n$, has a maximum change from about 0.1 to 0.14.

In the shallow GRIN singlet 42 (FIG. 2), the thickness index varies from about 0.2 to 1.35 efl's. The cover thickness varies from about 0.00 mm to about 1.2 mm. The bending varies from about 0.3 to about −0.4 and the index gradient in the radially inward direction has a maximum change $\Delta n$ from about 0.05 to 0.25.

For the radial GRIN lens 46 (FIG. 3), the lens thickness varies from about 0.2 to 1.2 efl's. The cover thickness varies from about 0.0 mm to 1.2 mm. The bending varies from about 0.4 to −0.4 and the index gradient $\Delta n$ in the radially inward direction has a maximum change from about 0.57 to 0.75.

FIG. 6 illustrates improvement in paraxial image height where the rms wavefront error is below the Marechal criteria and compares it to the conventional Olympus triplet lens shown in the above referenced U.S. Pat. Nos. 4,416,519 and 4,270,843. The axial GRIN lens 26 is of the highest quality and provides performance which is better in terms of NA than the conventional homogeneous triplet lens. Also, the efl is less than half that of the triplet thereby facilitating the miniaturization of the ODS head 16.

The overall length of the head which includes the beam width which is imposed because of the bending mirror 24 is less than half than with the conventional objective. Comparable lens designs and preferable designs for the axial GRIN, the radial GRIN and the shallow radial GRIN are illustrated in the following table:

|  | Olympus triplet | Axial GRIN singlet | Radial GRIN singlet | Shallow Radial GRIN singlet |
|---|---|---|---|---|
| design wavelength (nm) | 780. | 820 | 820. | 820 |
| $N_{00}$ | L1 = 1.515089 (BK7) L2 = L3 = 1.778621 (SF11) | 1.70 | 1.68 | 1.80 |
| $\Delta n$ | not applicable | −0.168199 | −0.0951994 | 0.150496 |
| Beam Width (mm) | 3.87 | 2.3 | 2.3 | 2.3 |
| Surface curvatures ($mm^{-1}$) | C1 = 0.13104 C2 = −0.24282 C3 = 0.06437 C4 = 0.31394 C5 = 0.09880 | C1 = 0.57590 C2 = 0.00000 | C1 = 0.62802 C2 = 0.00001 | C1 = 0.59547 C2 = 0.04594 |
| Element Thickness (mm) | L1 = 1.03 L2 = 1.00 ari2 = 0.01 L3 = 1.563 | 0.81275 | 0.7870 | 1.350 |
| WD (mm) | 2.208 | 0.7758 | 0.8023 | 0.5228 |
| Cover Thickness (mm) | 1.20 | 1.20 | 1.20 | 1.20 |
| Cover Index | 1.51 |  | 1.57 (polycarbonate) |  |
| Overall Length (mm) | 10.822 | 5.3886 | 5.3893 | 5.6728 |
| Field Angle, hfov (°) | 0.31 | 1.0 | 1.0 | 1.0 |
| NA | 0.45 | 0.65 | 0.65 | 0.65 |
| efl (mm) | 4.23 | 2.0 | 2.0 | 2.0 |

From the foregoing description, it will be apparent that there has been provided improved objectives for ODS heads. While preferred lens designs are set forth as are preferred ranges of parameters, variations and modifications within the scope of the invention will undoubtedly suggest themselves to those skilled in the art. Accordingly, the foregoing description should be taken as illustrative and not in a limiting sense.

We claim:

1. An objective for an optical data storage head which focuses a laser beam at a spot on an optical recording surface through a cover which presents a thickness of transparent material over said recording surface, which objective is disposed at a working distance from said surface and which is characterized as being a gradient index singlet having a front surface of curvature c1 and a back surface of curvature c2, said front and back surfaces respectively facing away from and toward said recording surface, said lens having an optical axis, a maximum thickness between said front and back surfaces along said optical axis, said lens having bending c2/c1 being selected for the thickness of said cover to provide correction for aberrations imposed by said lens on said beam when focused to said spot.

2. The objective according to claim 1 wherever said aberration correction corresponds to said spot having a paraxial image of height of from about 0.035 mm to 0.55 mm where the Marechal criterion is not exceeded thereby increasing the tolerance for tracking errors of said head on said recording surface.

3. The objective according to claim 1 wherein said singlet has a numerical aperture NA, of greater then 0.45.

4. The objective according to claim 3 wherein said NA is 0.65.

5. The objective according to claim 1 wherein said singlet has at least a portion thereof in which the refractive index varies to define said gradient index, the index variation defining a refractive element which does not contribute to the power of said lens which focuses the said beam to said spot.

6. The objective according to claim 5 wherein said singlet has an axial gradient index.

7. The objective according to claim 5 wherein said singlet has a shallow radial gradient index.

8. The objective according to claim 6 wherein said axial gradient index has a profile such that the index decreases along said optical axis, from a vertex of said objective where said front surface intersects said axis, in a direction along said axis towards said back surface.

9. The objective according to claim 8 wherein said index variation extends along a sag from said vertex at least to a location along said axis where a plane perpendicular to said axis between the intersection of said forward surface and the outer rays of said beam.

10. The objective according to claim 7 wherein said shallow radial gradient index has a profile wherein the variation in index occurs which extends from the periphery of said lens in a radially inward direction a distance less than half the radius of said lens, said index decreasing in said radially inward direction.

11. The objective according to claim 1 wherein said back surface is essentially planar ($c_2=0$).

12. The objective according to claim 6 wherein said back surface is essentially planar ($c_2=0$).

13. The objective according to claim 7 wherein said back surface is essentially planar ($c_2=0$).

14. The objective according to claim 1 wherein said singlet has a radial gradient index which increases in a radial direction inwardly from the periphery to the optical axis thereof.

15. The objective according to claim 14 wherein the singlet thickness varies between about 0.2 to 1.2 effective focal lengths (efl's), efl being the focal length measured from said back surface to the spot, said cover thickness varies from 0.00 mm to about 1.2 mm and said bending varies from about 0.4 to −0.4, and said index gradient in said radially inward direction has a maximum change, $\Delta n$, from about 0.075 to 0.57.

16. The objective according to claim 10 wherein said shallow gradient index signal's thickness varies from about 0.02 to 1.35 effective focal lengths (efl's), an efl being the focal length measured from said back surface to said spot, said cover thickness varies from about 0.00 mm to about 1.2 mm, said bending varies from about 0.3 to about −0.4, and said index gradient in said radial inward direction has a maximum change $\Delta n$ from about 0.05 to 0.2.

17. The objective according to claim 9 wherein the axial gradient index singlet's thickness varies from about 0.02 to 1.35 effective focal lengths (efl's), an efl being the focal length measured from said back surface to said spot, said cover thickness varies from about 0.00 mm to about 1.2 mm, said bending varies from about 0.1875 to about −0.4 and said index gradient in said optical direction has a maximum change $\Delta n$ from about 0.10 to 0.14.

18. The objective according to claim 1 wherein the curvature of said surfaces provides the power for said lens and said gradient index does not provide said power.

* * * * *